US009510689B2

(12) United States Patent
Kearse et al.

(10) Patent No.: US 9,510,689 B2
(45) Date of Patent: Dec. 6, 2016

(54) VALVE, SELF-INFLATING BLADDER ASSEMBLY, CUSHION ASSEMBLY AND METHOD FOR OPERATING THE SAME

(71) Applicant: Arden Companies, Inc., Bingham Farms, MI (US)

(72) Inventors: Cecil Kearse, Troy, MI (US); Timothy J. Essenmacher, Lathrup Village, MI (US); Jeffrey R. Colf, Jr., Farmington Hills, MI (US); Rafal J. Ignatowicz, Raleigh, NC (US)

(73) Assignee: Arden Companies, Inc., Bingham Farms, MI (US)

( * ) Notice: Subject to any disclaimer, the term of this patent is extended or adjusted under 35 U.S.C. 154(b) by 117 days.

(21) Appl. No.: 14/566,476

(22) Filed: Dec. 10, 2014

(65) Prior Publication Data
US 2015/0164237 A1   Jun. 18, 2015

Related U.S. Application Data

(60) Provisional application No. 61/915,843, filed on Dec. 13, 2013.

(51) Int. Cl.
*A47C 27/08* (2006.01)
*F16K 31/56* (2006.01)
(Continued)

(52) U.S. Cl.
CPC .............. *A47C 27/084* (2013.01); *A47C 7/021* (2013.01); *A47C 27/088* (2013.01); *A47C 27/15* (2013.01);
(Continued)

(58) Field of Classification Search
CPC ..... A47C 27/084; A47C 27/088; F16K 31/56; F16K 31/52408
(Continued)

(56) References Cited

U.S. PATENT DOCUMENTS 2,657,716 A * 11/1953 Ford ........................ D03D 1/02
                                                               139/386
3,428,295 A *  2/1969 Jones .................... F16K 31/528
                                                               251/144
(Continued)

*Primary Examiner* — David E Sosnowski
*Assistant Examiner* — Myles Throop
(74) *Attorney, Agent, or Firm* — Honigman Miller Schwartz and Cohn LLP

(57) ABSTRACT

A sub-assembly is disclosed. The sub-assembly is a valve including: a housing, a plunger, a seal, an indexing member, a biasing member, a seat member and a push button actuator. The plunger axially supports the seal and the indexing member within the housing. The biasing member is supported by the seat member and axially biases the plunger relative the housing in a first axial direction in order to axially bias the seal in the first axial direction toward a sealing surface formed by the housing. Arrangement of the seal adjacent the sealing surface formed by the housing prevents fluid flow through the valve. When the seal is arranged adjacent the sealing surface formed by the housing, a distal camming surface of the indexing member is not registered adjacent a corresponding camming surface of the housing. The push button actuator is arranged for movement relative the housing in a second axial direction that is opposite the first axial direction such that movement of the push button actuator relative the housing in the second axial direction results in a corresponding movement imparted to the plunger in the second axial direction. Movement of the plunger in the second axial direction results in corresponding axial movement of the seal in the second axial direction such that the seal is axially moved away from the sealing surface formed by the housing to thereby permit fluid flow through the valve. A self-inflating assembly is also disclosed. A cushion assembly is also disclosed. A method is also disclosed.

4 Claims, 15 Drawing Sheets

(51) Int. Cl.
  *A47C 27/15* (2006.01)
  *A47C 27/18* (2006.01)
  *A47C 27/22* (2006.01)
  *A47C 7/02* (2006.01)
  *F16K 31/524* (2006.01)

(52) U.S. Cl.
  CPC ............... *A47C 27/18* (2013.01); *A47C 27/22* (2013.01); *F16K 31/52408* (2013.01); *F16K 31/56* (2013.01)

(58) Field of Classification Search
  USPC ......................................................... 251/230
  See application file for complete search history.

(56) References Cited

U.S. PATENT DOCUMENTS

| | | | | |
|---|---|---|---|---|
| 3,872,525 | A * | 3/1975 | Lea | A47C 27/084 5/671 |
| 4,007,500 | A * | 2/1977 | Thompson | A47K 1/14 137/315.4 |
| 4,860,390 | A * | 8/1989 | Ohta | A47K 1/14 4/287 |
| 5,152,018 | A * | 10/1992 | Lea | A41D 31/0038 428/71 |
| 5,669,092 | A * | 9/1997 | Lin | A47C 27/081 5/420 |
| D396,630 | S * | 8/1998 | Lerner | D9/709 |
| 6,108,835 | A * | 8/2000 | Hwang | A47C 27/084 5/420 |
| 6,260,222 | B1 * | 7/2001 | Lin | A47C 27/088 5/420 |
| 6,651,277 | B1 * | 11/2003 | Marson | A47C 27/084 5/420 |
| 2004/0251442 | A1 * | 12/2004 | Scott | F16K 51/00 251/144 |
| 2011/0013299 | A1 * | 1/2011 | Marson | B32B 3/04 359/832 |
| 2011/0154574 | A1 * | 6/2011 | Hrubant | A47C 27/084 5/706 |
| 2013/0019409 | A1 * | 1/2013 | Blazar | A47G 9/1027 5/644 |

* cited by examiner

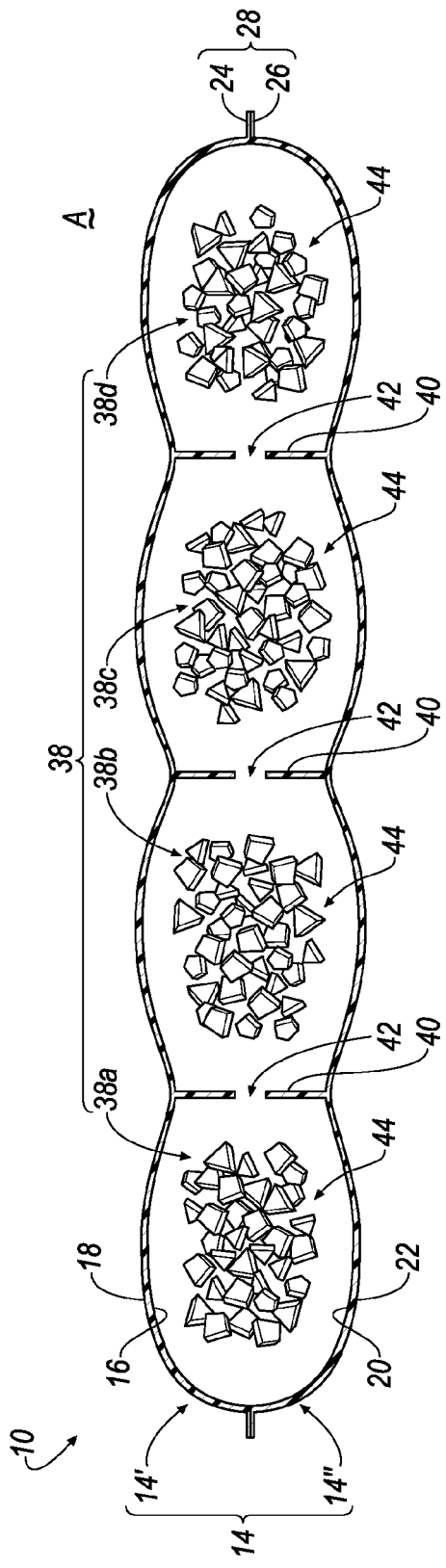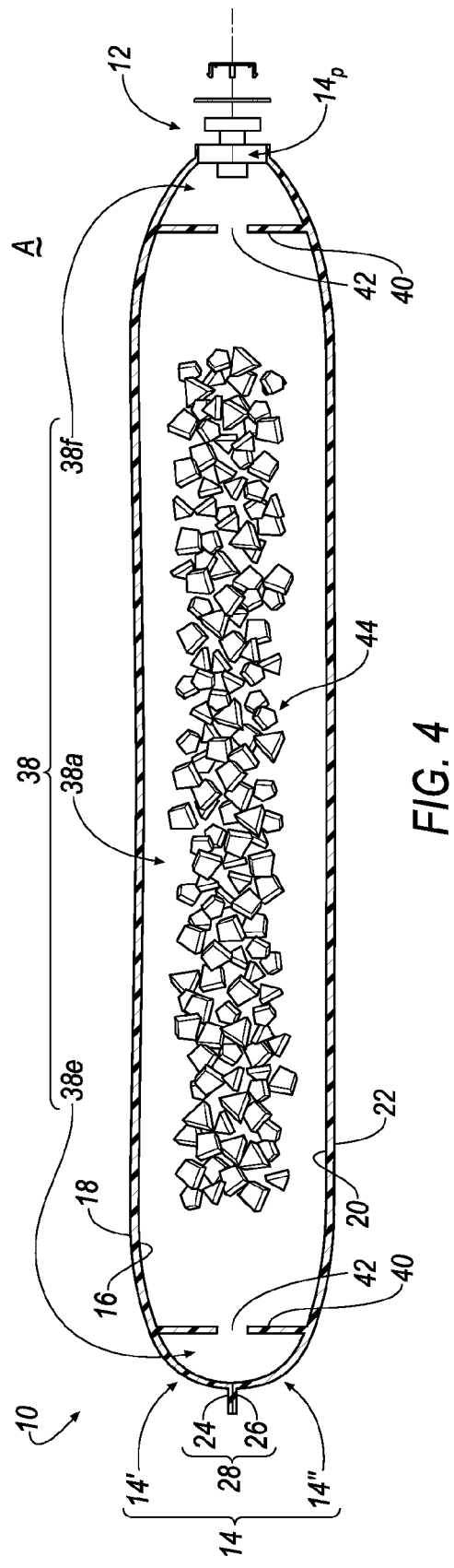

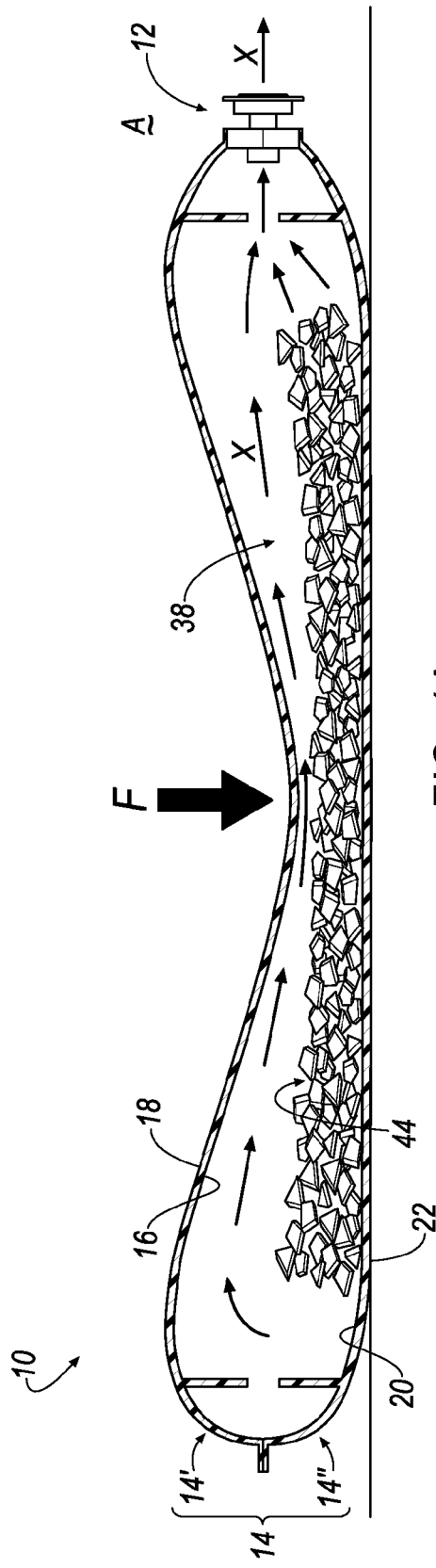
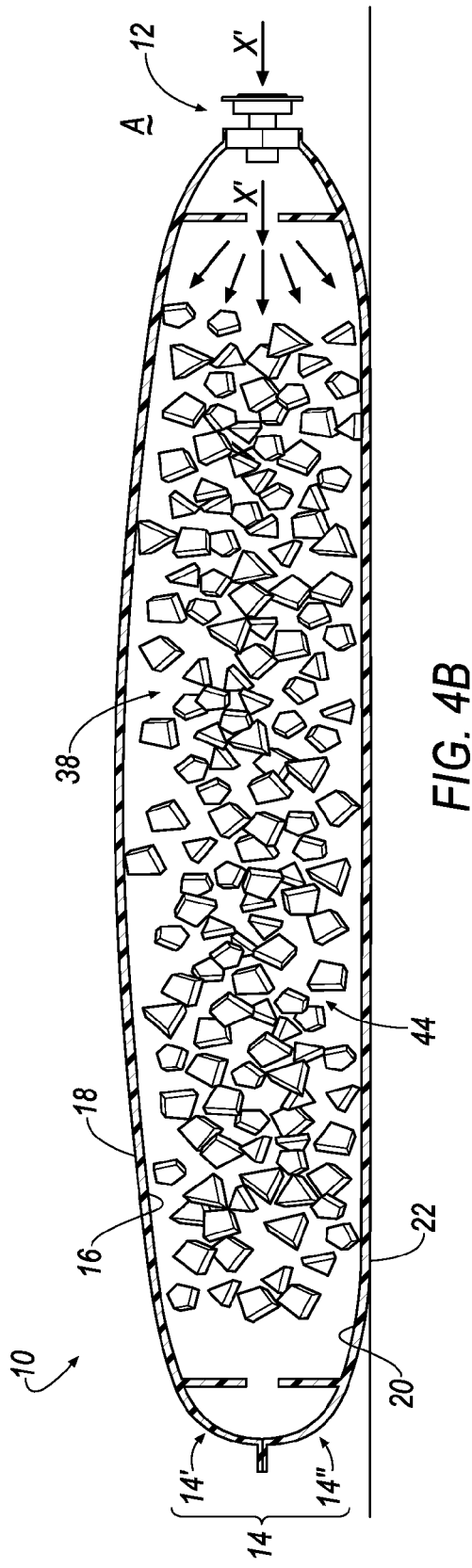
FIG. 4A
FIG. 4B

VALVE, SELF-INFLATING BLADDER ASSEMBLY, CUSHION ASSEMBLY AND METHOD FOR OPERATING THE SAME

CROSS-REFERENCE TO RELATED APPLICATIONS

This U.S. patent application claims priority to U.S. Provisional Application 61/915,843 filed on Dec. 13, 2013 the disclosure of which is considered part of the disclosure of this application and is hereby incorporated by reference in its entirety.

FIELD OF THE INVENTION

The disclosure relates to a valve, a self-inflating bladder assembly, a cushion assembly and a method for operating the same.

DESCRIPTION OF THE RELATED ART

Improvements to cushioning elements are continuously being sought in order to advance the arts.

BRIEF DESCRIPTION OF THE DRAWINGS

The disclosure will now be described, by way of example, with reference to the accompanying drawings, in which:

FIG. 3 is a cross-sectional view of the self-inflating bladder assembly according to line 3-3 of FIG. 1.

FIG. 4 is a cross-sectional view of the self-inflating bladder assembly according to line 4-4 of FIG. 1.

FIG. 4A is a view of the self-inflating bladder assembly of FIG. 4 with a valve arranged in at least a partially open orientation when an external force is applied to the self-inflating bladder assembly.

FIG. 4B is a view of the self-inflating bladder assembly of FIG. 4 with the valve arranged in at least a partially open orientation after the external force of FIG. 4A is removed from the self-inflating bladder assembly.

SUMMARY

Figure 1:
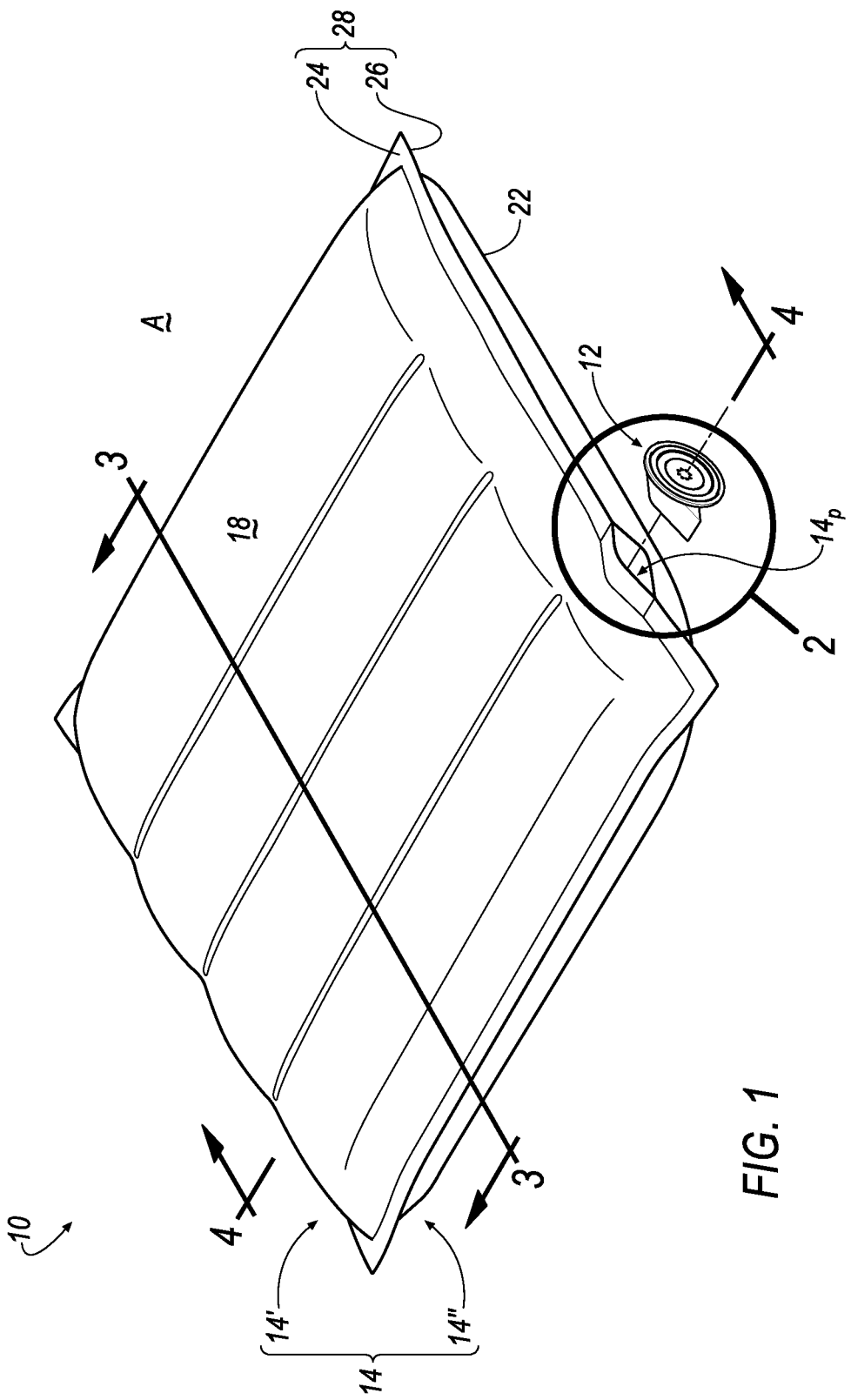
FIG. 1 is a partially exploded perspective view of a self-inflating bladder assembly in accordance with an exemplary embodiment of the invention.

One aspect of the disclosure provides a sub-assembly including a valve. The valve includes a housing and a plunger that axially supports a seal and an indexing member within the housing. The valve further includes a biasing member supported by a seat member that axially biases the plunger relative the housing in a first axial direction in order to axially bias the seal in the first axial direction toward a sealing surface formed by the housing. Arrangement of the seal adjacent the sealing surface formed by the housing prevents fluid flow through the valve. When the seal is arranged adjacent the sealing surface formed by the housing, a distal camming surface of the indexing member is not registered adjacent a corresponding camming surface of the housing. The valve further includes a push button actuator arranged for movement relative the housing in a second axial direction that is opposite the first axial direction such that movement of the push button actuator relative the housing in the second axial direction results in a corresponding movement imparted to the plunger in the second axial direction. Movement of the plunger in the second axial direction results in corresponding axial movement of the seal in the second axial direction such that the seal is axially moved away from the sealing surface formed by the housing to thereby permit fluid flow through the valve.

In some implementations, the biasing member is a coil spring.

In some examples, the housing includes an upper housing portion connected to a lower housing portion. The indexing member is contained within the housing.

In some instances, the seal is arranged within a circular channel formed by a seal seat surface of the plunger. A proximal end of the coil spring is disposed adjacent a spring seat surface of the spring seat. A distal end of the coil spring is disposed adjacent a shoulder surface of the plunger.

In some implementations, an outer threaded surface of the spring seat is threadingly-coupled to an inner threaded surface that partially defines a passage extending through the lower housing portion. A stem portion of the plunger extends through the passage extending through the lower housing portion and then through a passage formed by the indexing carrier until a distal tip of the stem portion of the plunger registers within a receiver formed by the push button.

In some examples, the valve includes a body disposed over: side surfaces of each of the upper housing portion and the lower housing portion, a proximal surface of the lower housing portion, and a distal surface of the upper housing portion.

In some instances, the body is molded over the upper housing portion and the lower housing portion for non-removably-retaining the upper housing portion and the lower housing portion.

In some implementations, the body is formed to includes a parallelepiped-shaped geometry having opposing acute angle corner portions and opposing obtuse angle corner portions.

Another aspect of the disclosure provides a self-inflating assembly including a bladder, a valve and cushioning media. The bladder forms a passage. The valve is supportably-retained within the passage in an airtight fit with respect to the bladder. The cushioning media is contained within a cavity formed by the bladder. The cushioning media is spatially deformable between an at-rest, expanded orientation and a fully compressed orientation. Arrangement of the valve in a closed orientation prevents the cavity from being in fluid communication with atmosphere surrounding the bladder. Arrangement of the valve in a fully open or partially open orientation permits the cavity to be in fluid communication with the atmosphere surrounding the bladder.

In some implementations, the bladder includes a non-porous material that is impervious to air.

In some examples, the bladder includes an upper bladder portion connected to a lower bladder portion. The upper bladder portion is defined by an inner surface, an outer surface and a perimeter portion. The lower bladder portion is defined by an inner surface, an outer surface and a perimeter portion. A portion of the inner surface of the upper bladder portion defined by the perimeter portion of the upper bladder portion is joined to a portion of the inner surface of the lower bladder portion defined by the perimeter portion of the lower bladder portion collectively defines a perimeter lip of the bladder.

In some instances, a segment of the perimeter portion defined by the upper bladder portion and a segment of the perimeter portion defined by the lower bladder portion are not joined together in order to define the passage that supportably-retains the valve.

In some implementations, access to the passage is permitted by an inner opening and an outer opening formed by both of the upper bladder portion and the lower bladder portion. At least one of the inner opening and the outer opening are defined by a parallelepiped-shaped geometry having: opposing acute angle corner portions and opposing obtuse angle corner portions.

In some examples, the bladder includes one or more internal rib members extending away from one or both of the inner surface of the upper bladder portion and the inner surface of the lower bladder portion. Each of the one or more internal rib members form an airflow passage. The one or more internal rib members divide the cavity into a plurality of sub-cavities that are in fluid communication with one another by way of the passage formed in each of the one or more internal rib members.

In yet another aspect of the disclosure, a cushion assembly includes a shell, a self-inflating assembly, a trim bezel and a retaining ring. The shell forms a passage. The shell includes an interior surface and an exterior surface. The interior surface of the shell defines a shell cavity. The self-inflating assembly is disposed within the shell cavity. A valve is arranged within the passage formed by the shell. The trim bezel is arranged about the passage of the shell such that a proximal surface of the trim bezel is disposed adjacent the outer surface of the shell. The retaining ring includes projections inserted through passages formed by the trim bezel and housing for securing the valve to the shell.

In some implementations, the shell includes a fabric material.

In some examples, the fabric material is a water proof or water resistant porous material that permits air to flow there-through.

In some instances, the cushion assembly includes cushioning media disposed within the shell cavity and arranged between the bladder and the interior surface of the shell.

Another aspect of the disclosure provides a method for operating a self-inflating assembly including a steps of: arranging cushioning media in the at-rest, expanded orientation within a cavity of a bladder for arranging opposing inner surfaces of the bladder in a spaced-apart relationship; applying an external force to the bladder; after the applying step, arranging a valve in an open orientation for: permitting the opposing inner surfaces of the bladder to be arranged closer together for: spatially manipulating the cushioning media contained within the cavity of the bladder from the at-rest, expanded orientation to a compressed orientation and forcing air out of the cavity to surrounding atmosphere.

In some implementations, while forcing air out of the cavity, the open orientation of the valve is a partially open orientation. The method also includes the step of: returning the valve to the closed orientation before arranging the cushioning media in the fully compressed orientation such that: not all of the air has been forced out of the cavity and into surrounding atmosphere and the cushioning media is arranged in a partially compressed orientation.

In some examples, the method also includes the steps of removing the external force applied to the bladder and returning the valve to the open orientation for: permitting the cushioning media to return to the at-rest, expanded orientation from the partially compressed orientation for: driving the opposing inner surfaces of the bladder apart for: self-inflating the bladder by drawing air into the cavity from surrounding atmosphere.

In some instances, while forcing air out of the cavity, the open orientation of the valve is a locked, fully open orientation. The method also includes the steps of: arranging the cushioning media in the fully compressed orientation and returning the valve to the closed orientation such that about all of the air within the cavity has been forced out of the cavity and into surrounding atmosphere.

In some implementations, the method includes the steps of: removing the external force applied to the bladder and returning the valve to the open orientation for: permitting the cushioning media to return to the at-rest, expanded orientation from the fully compressed orientation for: driving the opposing inner surfaces of the bladder apart for: self-inflating the bladder by drawing air into the cavity from surrounding atmosphere.

DETAILED DESCRIPTION OF THE INVENTION

The Figures illustrate exemplary embodiments of a valve, a self-inflating bladder assembly, a cushion assembly and a method for operating the same. Based on the foregoing, it is to be generally understood that the nomenclature used herein is simply for convenience and the terms used to describe the invention should be given the broadest meaning by one of ordinary skill in the art.

Referring to FIG. 1, a self-inflating bladder assembly is shown generally at 10.

Figure 2:
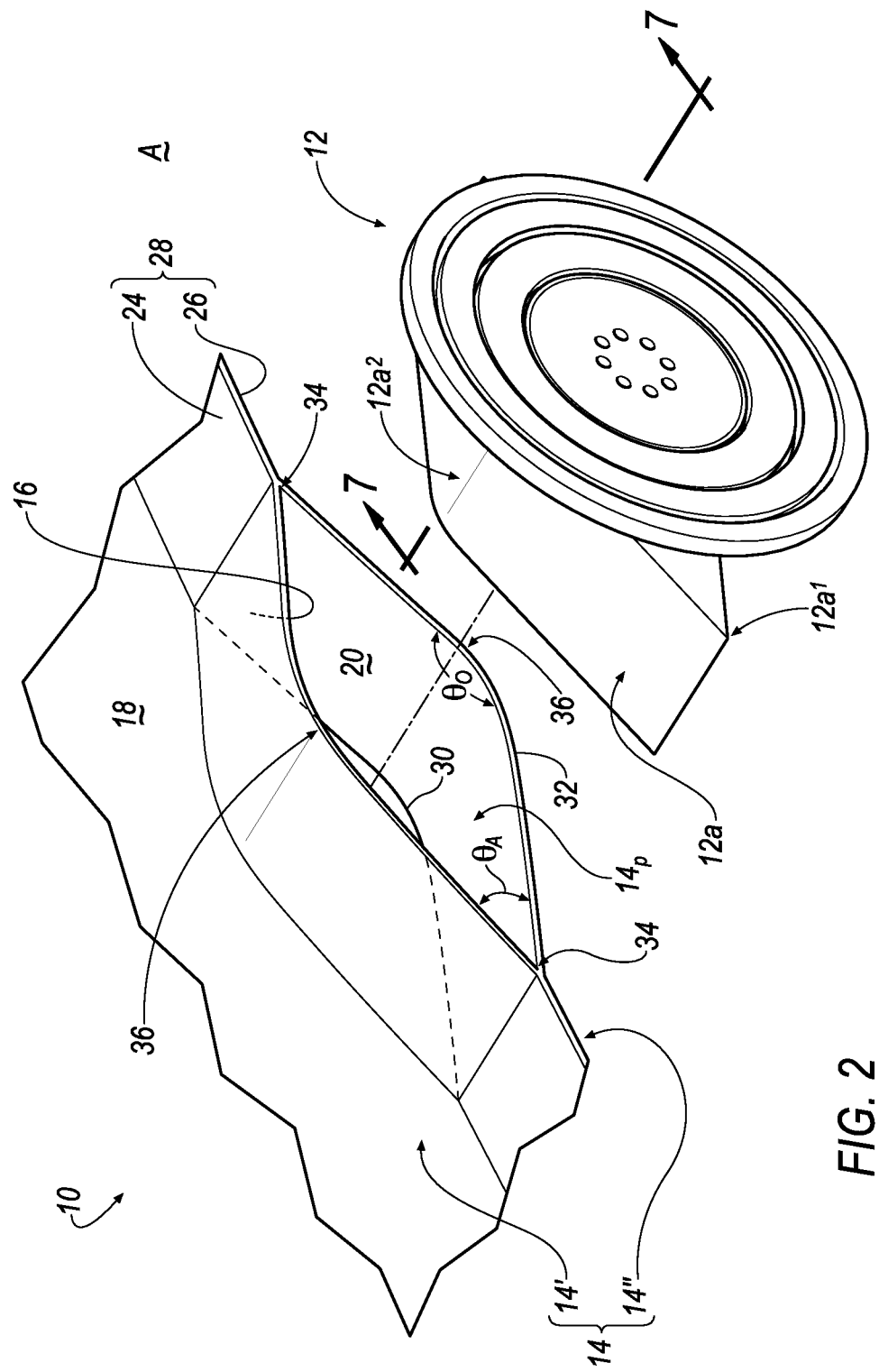
FIG. 2 is an enlarged view of a portion of the self-inflating bladder assembly according to line 2 of FIG. 1.

Referring to FIG. 2, the self-inflating bladder assembly 10 includes a valve, which is shown generally at 12. The valve 12 is supportably-retained within a passage 14p formed by a self-inflating bladder 14 of the cushion assembly 10. The self-inflating bladder 14 may include, for example, a non-porous material that is impervious to air (e.g., rubber, plastics, fiber and fabric reinforced materials). The valve 12 is a sub-assembly defined by a plurality of interconnected structural components 12a-12j that will be described in greater detail in the following disclosure at FIGS. 7-10. A method for operating the self-inflating bladder assembly 10 will be described in greater detail in the following disclosure at FIGS. 11A-11C.

Referring to FIGS. 1-4, the self-inflating bladder 14 may include an upper bladder portion 14' and a lower bladder portion 14". The upper bladder portion 14' may be defined by an inner surface 16 (see, e.g., FIGS. 3-4) and an outer surface 18. The lower bladder portion 14" may also be defined by an inner surface 20 (see, e.g., FIGS. 3-4) and an outer surface 22.

As seen in FIGS. 3-4, the upper bladder portion 14' may include a perimeter portion 24. The lower bladder portion 14" may also include a corresponding perimeter portion 26. The inner surface 16 of the upper bladder portion 14' defined by the perimeter portion 24 and the inner surface 20 of the lower bladder portion 14" defined by the perimeter portion 26 may be joined together (e.g., by an ultrasonic weld, adhesive or the like) such that the upper bladder portion 14' and the lower bladder portion 14" collectively defines a perimeter lip 28 of the self-inflating bladder 14.

Referring to FIG. 2, a portion of the inner surface 16 of the upper bladder portion 14' defined by the perimeter portion 24 and a portion of the inner surface 20 of the lower bladder portion 14" defined by the perimeter portion 26 are not joined together in order to define the passage 14p that supportably-retains the valve 12. Therefore, a portion of the inner surface 16 of the upper bladder portion 14' and a portion of the inner surface 20 of the lower bladder portion 14" may be said to define the passage 14p.

Access to the passage 14p is permitted by an inner opening 30 and an outer opening 32. At least one of the inner opening 30 and the outer opening 32 may be defined by a parallelepiped-shaped geometry having: opposing acute angle $\theta_A$ corner portions 34 (i.e., two regions of the perimeter lip 28 where the inner surface 16, 20 of the upper bladder portion 14' and the lower bladder portion 14" begin diverge from one another) and opposing obtuse angle $\theta_O$ corner portions 36 (i.e., a region of the perimeter lip 28 where the inner surface 16, 20 of the upper bladder portion 14' and the lower bladder portion 14" diverge from one another at a peak).

Referring to FIGS. 3-4, upon joining the perimeter portion 24 and the perimeter portion 26 together, the inner surface 16 of the upper bladder portion 14' and the inner surface 20 of the lower bladder portion 14" collectively define a cavity 38 of the self-inflating bladder 14. When the valve 12 is supportably-retained in the passage 14p, and, when the valve 12 is arranged in a closed orientation (see, e.g., FIG. 11A), the cavity 38 is fluidly sealed off from surrounding atmosphere, A. Fluid access to cavity 38 is permitted when the valve 12 is arranged in an open orientation (see, e.g., FIG. 11B) or a partially open orientation (see, e.g., FIG. 11C).

Referring to FIG. 3, the self-inflating bladder 14 may also optionally include one or more internal rib members 40 extending away from one or both of the inner surface 16 of the upper bladder portion 14' and the inner surface 20 of the lower bladder portion 14". The one or more internal rib members 40 may divide the cavity 38 into a plurality of sub-cavities 38a, 38b, 38c, 38d, 38e, 38f. Each of the one or more internal rib members 40 forms a passage 42 that permits all of the sub-cavities 38a, 38b, 38c, 38d, 38e, 38f to be in fluid communication with one another. Functionally, the one or more internal rib members 40 increase the structural integrity of the self-inflating bladder 14.

Referring to FIGS. 3 and 4, the cavity 38 may be filled with cushioning media 44. The cushioning media 44 may include, for example, one or more pieces of foam. Referring to FIGS. 4 and 4A-4B, the one or more pieces of foam 44 may be arranged in a compressed state (see, e.g., FIG. 4A) or in a relaxed, expanded state (see, e.g., FIGS. 4 and 4B).

When: an external force, F (see e.g., FIG. 4A), is applied to one or more of the outer surfaces 18, 22 of the self-inflating bladder 14, and the valve 12 is arranged in at least a partially open orientation, the one or more pieces of foam 44 contained within the cavity 38 of the self-inflating bladder 14 is/are spatially deformed such that they are crushed between the inner surfaces 16, 20 of the self-inflating bladder 14, thereby reducing a spatial volume defining the cavity 38 and driving air (see, e.g., arrows, X) out of the cavity 38 by way of the valve 12 and into surrounding atmosphere, A. Then, when the external force, F, is removed (see, e.g., FIG. 4B), and the valve 12 is arranged in at least a partially open orientation, the one or more pieces of foam 44 contained within the cavity 38 of the self-inflating bladder 14 is/are permitted to spatially deform and "spring" back from the crushed orientation to an expanded orientation; as the one or more pieces of foam 44 expand, the one or more pieces of foam 44 push apart the inner surfaces 16, 20 of the self-inflating bladder 14, thereby increasing the spatial volume defining the cavity 38, and, as a result, air (see, e.g., arrows, X') is drawn into the cavity 38 by way of the valve 12 from surrounding atmosphere, A, thereby conducting an automatic or self-inflation of the cavity 38.

Figure 11A:
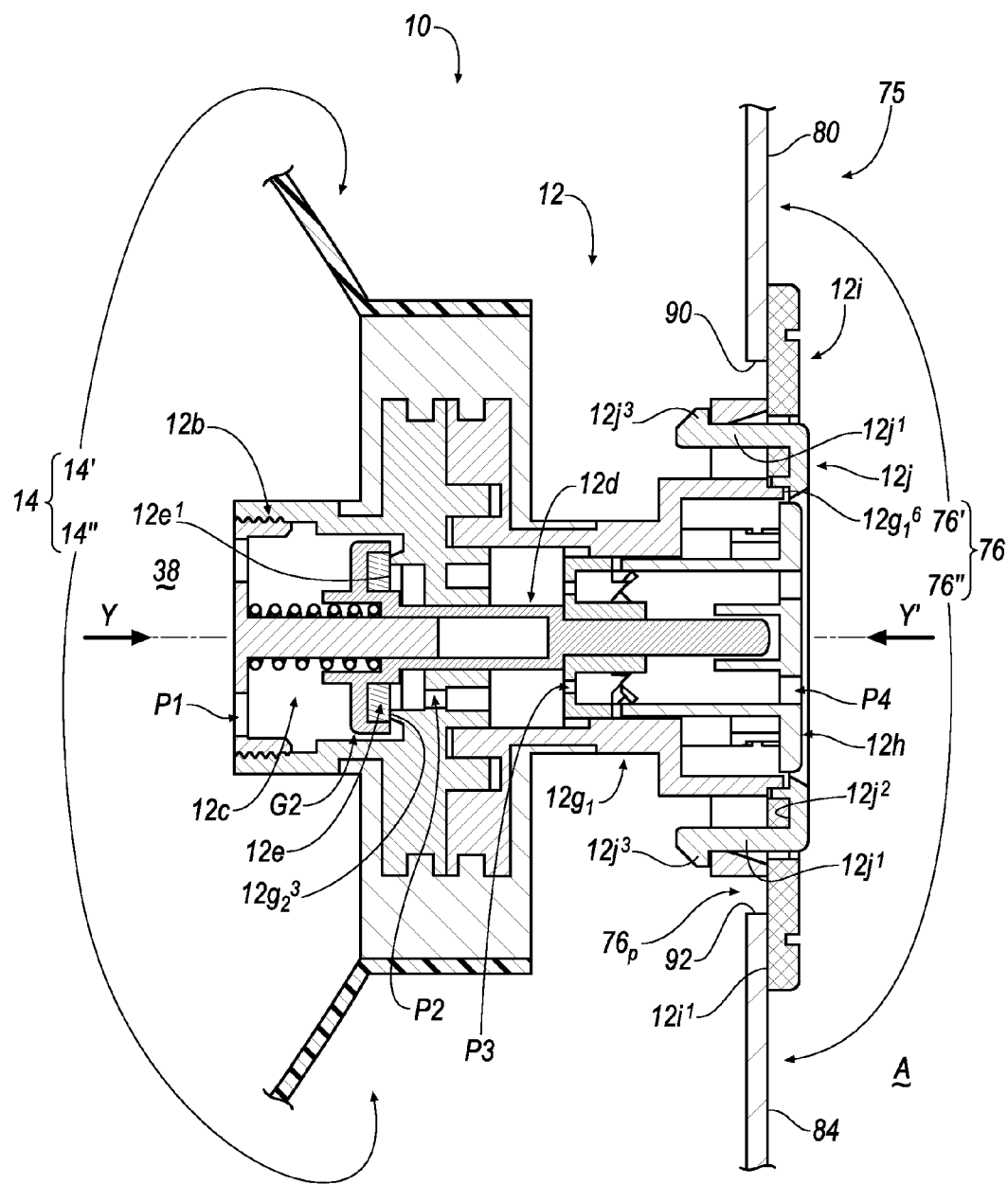
FIG. 11A is an enlarged, assembled cross-sectional view of the cushion assembly according to line 11 of FIG. 6B.
Figure 11B:
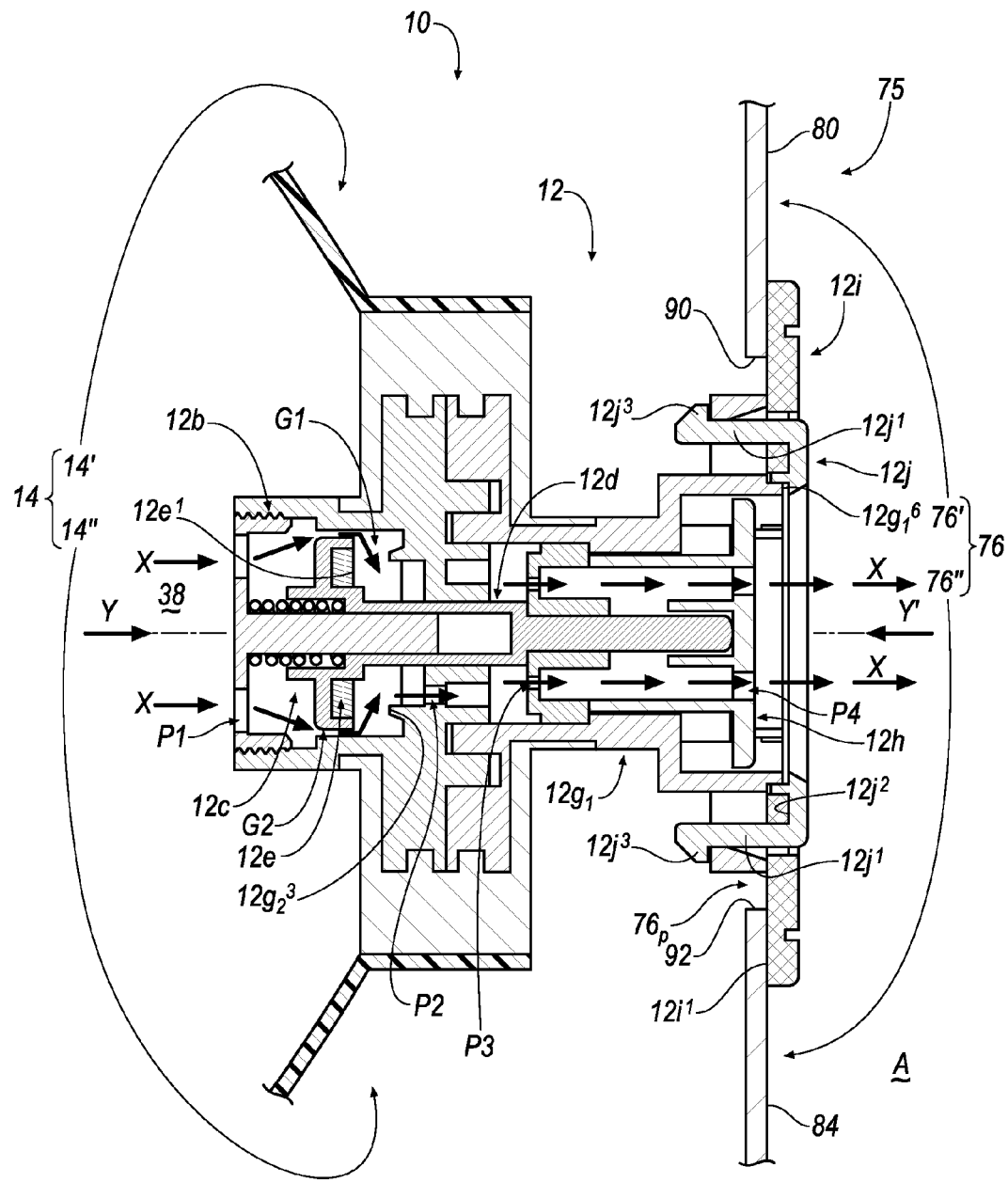
FIG. 11B is another enlarged, assembled cross-sectional view of the cushion assembly according to line 11 of FIG. 6B.
Figure 11C:
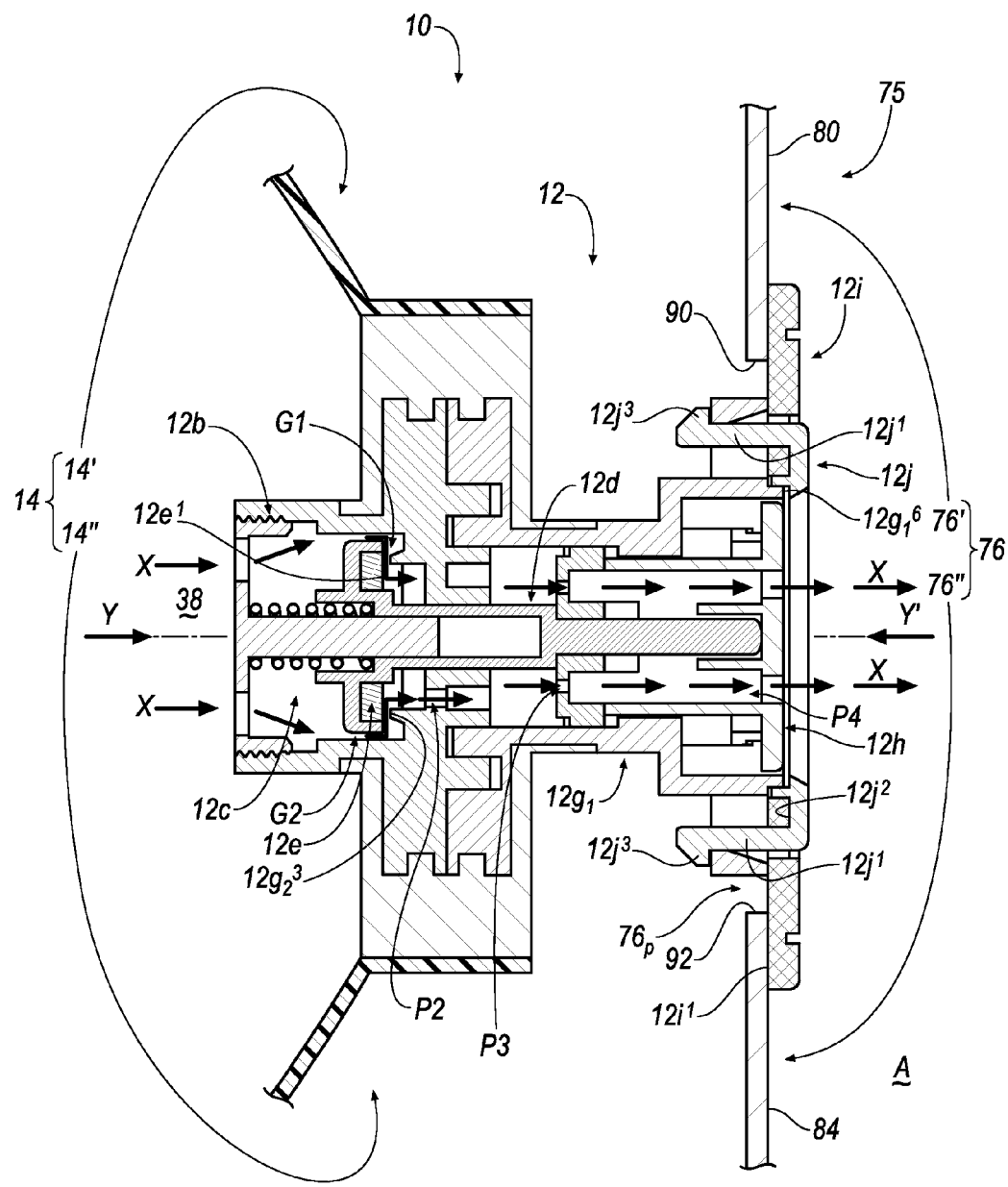
FIG. 11C is yet another enlarged, assembled cross-sectional view of the cushion assembly according to line 11 of FIG. 6B.
Figure 12:
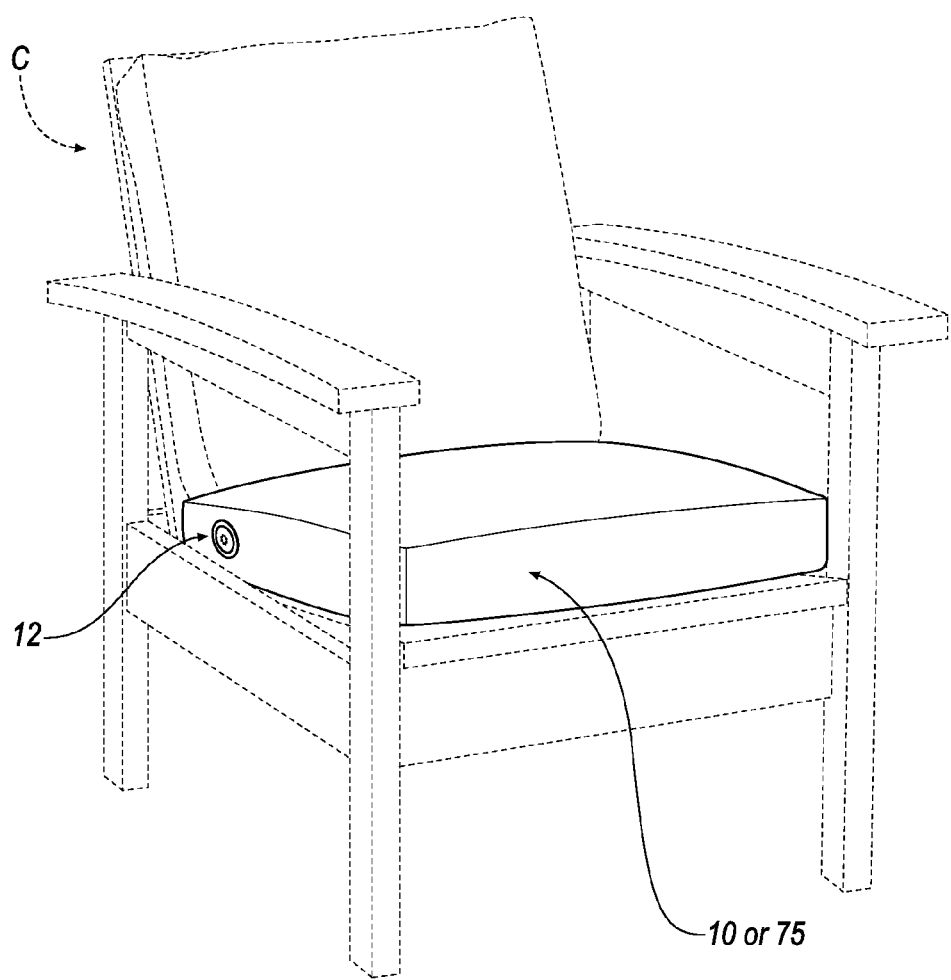
FIG. 12 is a perspective view of a chair supporting either the self-inflating bladder assembly of FIG. 1 or the cushion assembly of FIGS. 5A-6B.

As a result of the arrangement of the structural components defining the self-inflating bladder assembly 10 as described above at FIGS. 1-4B, a user may be permitted to selectively open and close the valve 12 in order to adjust the spatial volume of the cavity 38, and, as a result, the firmness of the self-inflating bladder assembly 10 (if, for example, the self-inflating bladder assembly 10 is utilized as a seat cushion disposed adjacent, for example, a chair, C, as seen in FIG. 12). Further, the user may (as seen in FIG. 4A): arrange the self-inflating bladder assembly 10 in a substantially flat state (by forcing all of the air out of the cavity 38) and then arrange the valve 12 in a closed orientation (as seen in FIG. 11A), thereby preventing air from being draw back into the cavity 38; when the user spatially manipulates the self-inflating bladder assembly 10 as described above, the self-inflating bladder assembly 10 may be arranged in a compact state for storage when the self-inflating bladder assembly 10 is not in use. Conversely, when the self-inflating bladder assembly 10 is removed from storage, the user may arrange the valve 12 in an open orientation (as seen in FIG. 11B) or a partially open orientation (as seen in FIG. 11C), thereby permitting the one or more pieces of foam 44 to expand from the crushed state, which causes the auto or self-inflating act of the self-inflating bladder assembly 10 to occur as a result of drawing of air therein from surrounding atmosphere, A, which causes expansion of the spatial volume of the cavity 38.

Referring to FIGS. 5A-5B and 6A-6B, a cushion assembly is shown generally at 75. The cushion assembly 75 may include a self-inflating bladder assembly 10 and a shell 76. In some implementations, the self-inflating bladder assembly 10 may be substantially similar to the self-inflating bladder assembly described above at FIGS. 1-4B. The shell 76 may include, for example, a water proof or water resistant porous material (e.g., a water proof or water resistant fabric material or the like) that permits air to flow there-through. The cushion assembly 75 operates in a substantially similar manner as described above (at FIGS. 1-4B) with respect to the self-inflating bladder assembly 10 (e.g., a user may operate the valve 12 in order to: selectively adjust the firmness of the self-inflating bladder assembly 10, arrange the cushion assembly 75 in a compact, storage state and auto or self-inflate the cushion assembly 75.

Figure 5A:
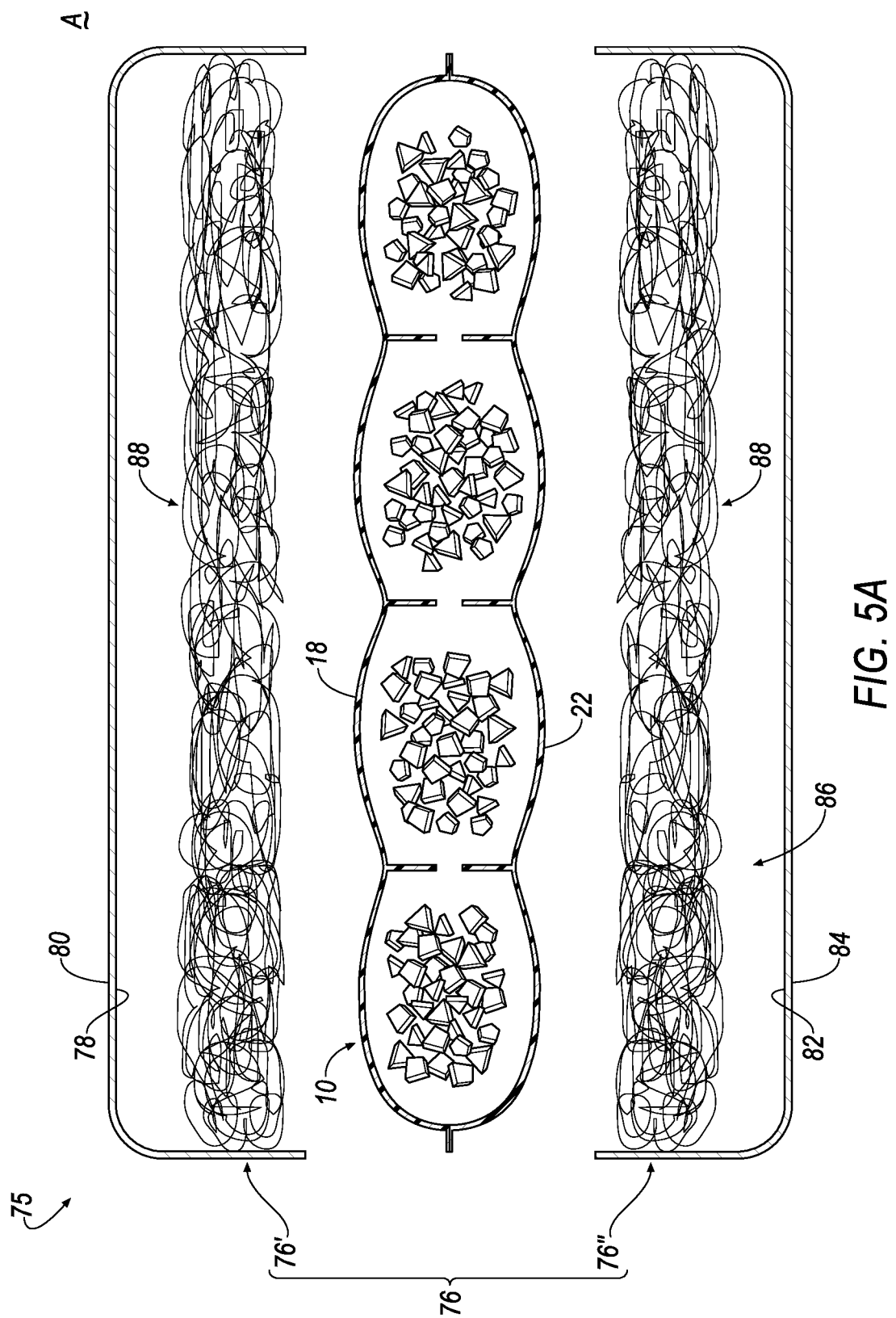
FIG. 5A is an exploded cross-sectional view of a cushion assembly including the self-inflating bladder assembly of FIG. 3.
Figure 5B:
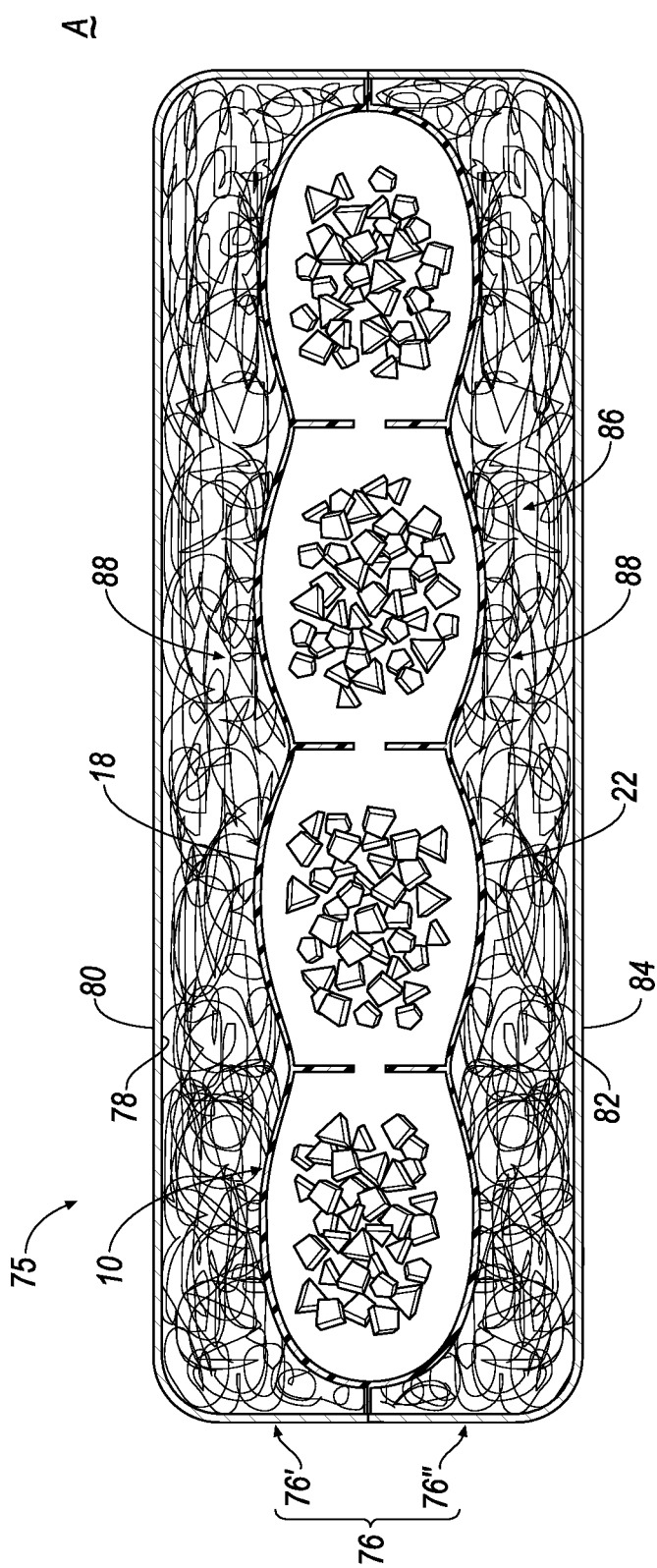
FIG. 5B is an assembled cross-sectional view of the cushion assembly of FIG. 5A.
Figure 6A:
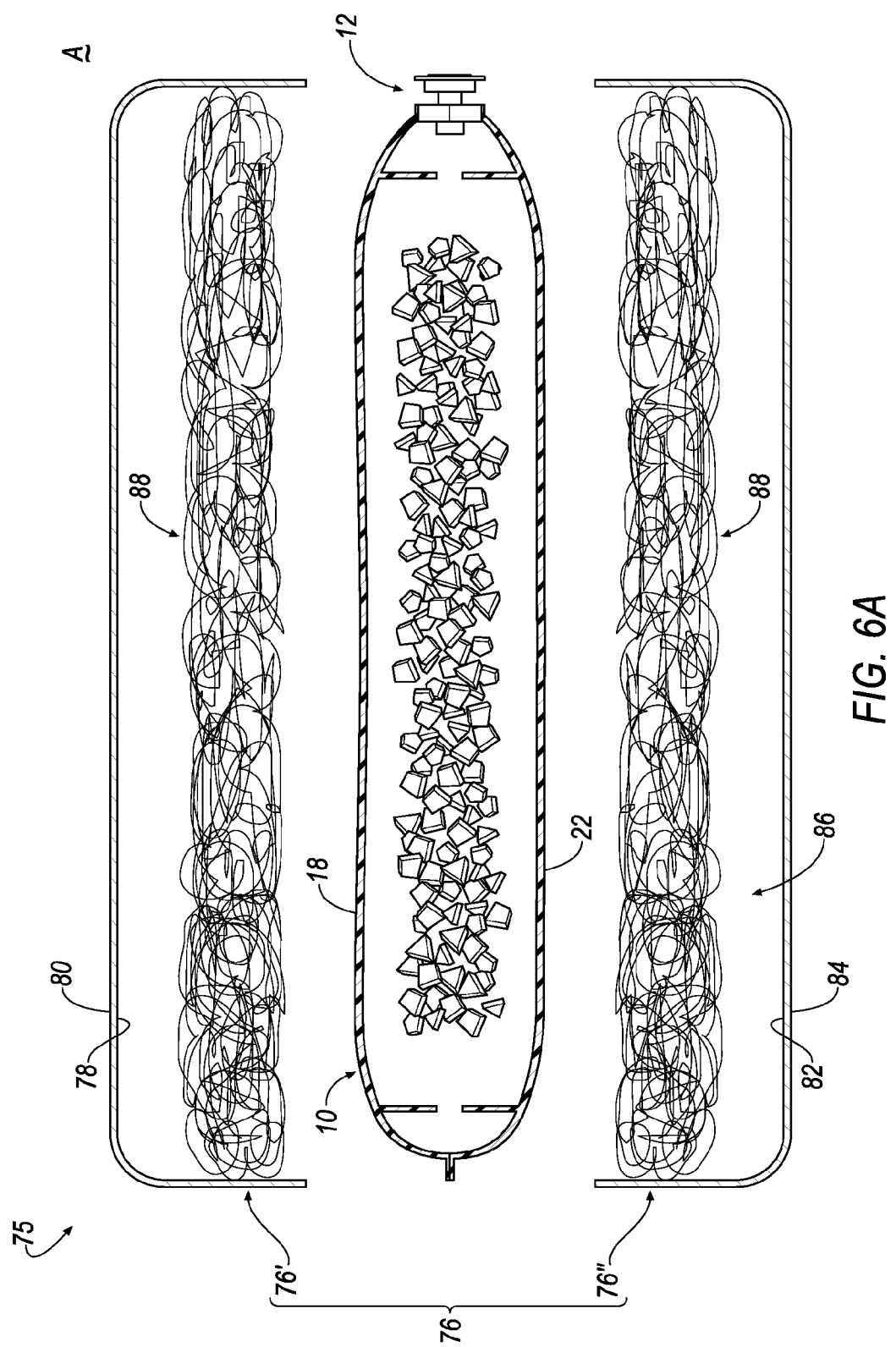
FIG. 6A is an exploded cross-sectional view of the cushion assembly including the self-inflating bladder assembly of FIG. 4.
Figure 6B:
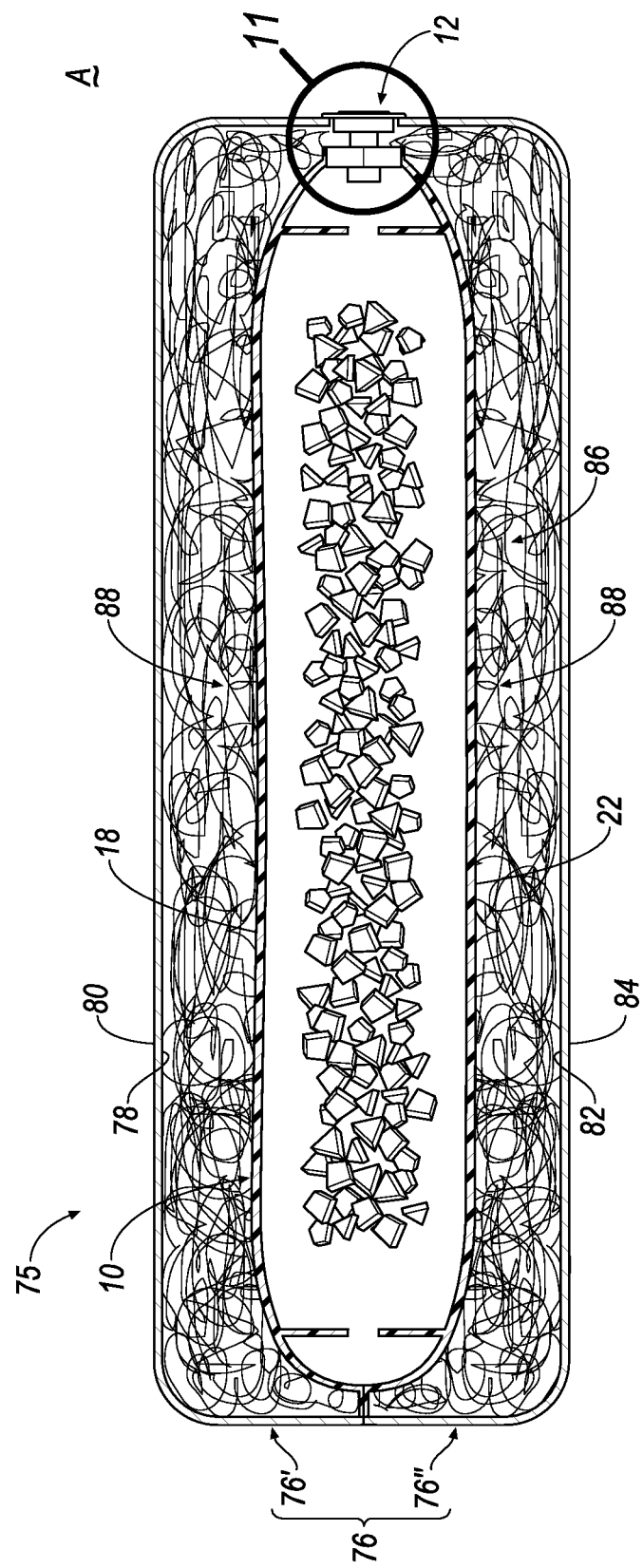
FIG. 6B is an assembled cross-sectional view of the cushion assembly of FIG. 6A.

Referring to FIGS. 5A and 6A, the shell 76 may include an upper shell portion 76' and a lower shell portion 76". The upper shell portion 76' may be defined by an inner surface 78 and an outer surface 80. The lower shell portion 76" may also be defined by an inner surface 82 and an outer surface 84. Upon joining (e.g., by stitching, ultrasonic welding or the like) the upper shell portion 76' and the lower shell portion 76", the inner surface 78 of the upper shell portion 76' and the inner surface 82 of the lower shell portion 76" collectively define a cavity 86 of the shell 76. The self-inflating bladder assembly 10 is disposed within the cavity 86 of the shell 76 such that the shell 76 contains the self-inflating bladder assembly 10. As seen in FIG. 6B, the shell 76 may contain all of the self-inflating bladder assembly 10 except for a distal portion of the valve 12, which may be exposed to atmosphere, A.

Referring to FIGS. 5A-5B and 6A-6B, the cushion assembly 75 may also optionally include cushioning media 88. The cushioning media 88 may be disposed between: the outer surface 18 of the upper bladder portion 14' and the inner surface 78 of the upper shell portion 76' and the outer surface 22 of the lower bladder portion 14" and the inner surface 82 of the lower shell portion 76". In an example, the cushioning media 88 may be substantially similar to the cushioning media 44 and may include, for example, one or more pieces of foam. In another example, the cushioning media 88 may include fibers, feathers or the like. By surrounding the self-inflating bladder assembly 10 with one or more of the shell 76 and the cushioning media 88, an increased comfort level may be provided to a user when the cushion assembly 75 is utilized as a seat cushion disposed adjacent, for example, a chair, C, as seen in FIG. 12. The shell 76 may also include an aesthetically-pleasing fabric material whereas the outer surface 18, 22 of the self-inflating bladder assembly 10 may be defined by a non-aesthetically-pleasing plastic or rubber material.

Figure 7:
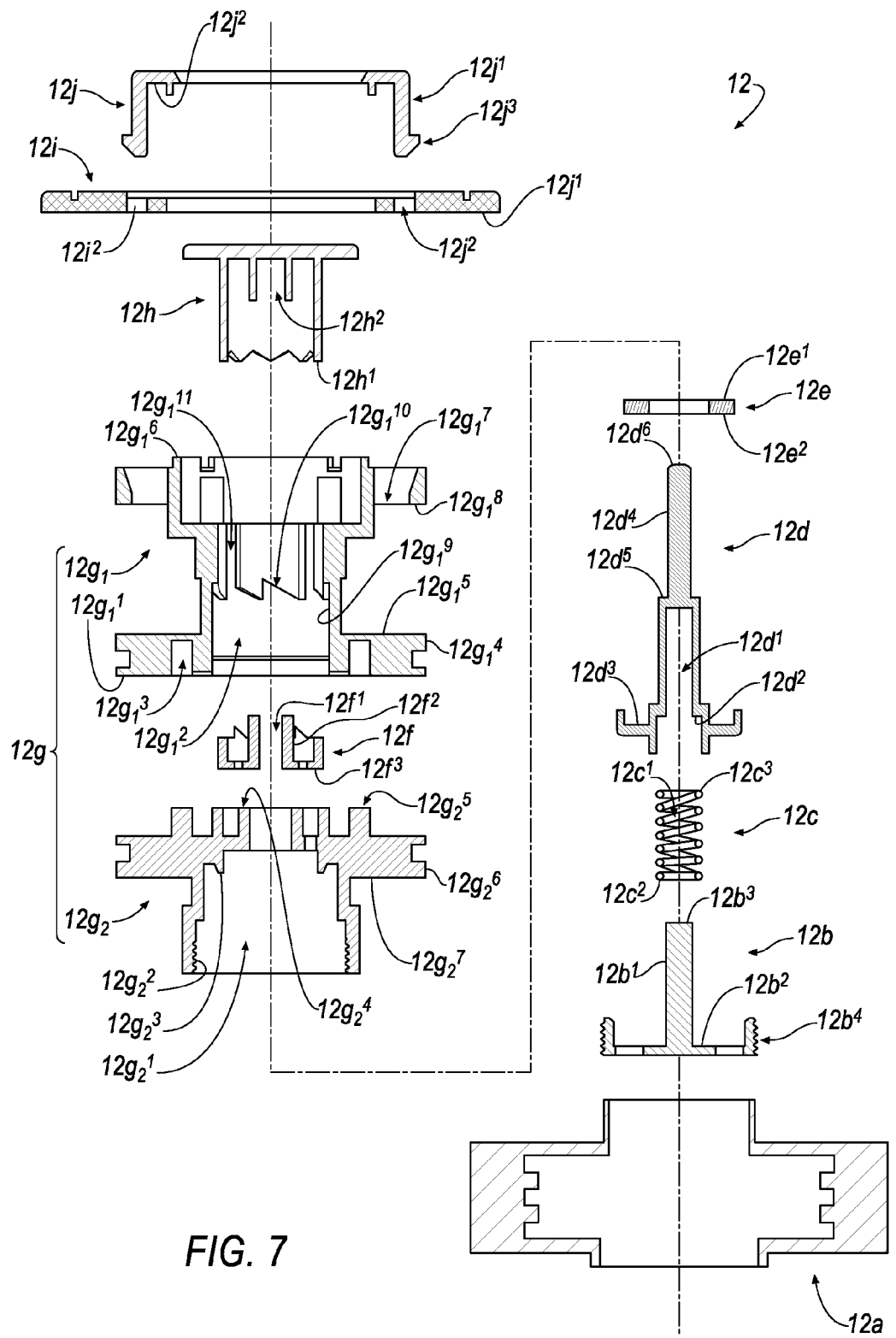
FIG. 7 is an exploded cross-sectional view of an exemplary valve of the self-inflating bladder assembly according to line 7-7 of FIG. 2.

Referring to FIG. 7, a plurality of interconnected structural components of the valve 12 are shown generally at $12a$-$12j$. The plurality of interconnected structural components $12a$-$12j$ may include, for example: a body $12a$, a spring seat $12b$, a coil spring $12c$, a plunger $12d$, a circular seal $12e$, an indexing carrier $12f$, a housing $12g$ formed by an upper housing portion $12g_1$ and a lower housing portion $12g_2$, a push button $12h$, a trim bezel $12i$ and a retaining ring $12j$. With reference to an assembled view of the valve 12 as seen in FIG. 11A, the plurality of interconnected structural components $12a$-$12j$ may be connected as follows.

A stem portion $12b^1$ of the spring seat $12b$ extends through an axial passage $12c^1$ formed by the coil spring $12c$. A proximal end $12c^2$ of the coil spring $12c$ is disposed adjacent a spring seat surface $12b^2$ of the spring seat $12b$.

A distal end $12b^3$ of the stem portion $12b^1$ of the spring seat $12b$ and a distal end $12c^3$ of the coil spring $12c$ are arranged within an axial passage $12d^1$ of the plunger $12d$. The distal end $12c^3$ of the coil spring $12c$ is disposed adjacent an inner shoulder surface $12d^2$ that defines a portion of the axial passage $12d^1$ of the plunger $12d$ thereby retaining the coil spring $12c$ between the spring seat $12b$ and the plunger $12d$.

The circular seal $12e$ includes an upper surface $12e^1$ and a lower surface $12e^2$. The circular seal $12e$ is arranged within a circular channel formed by a seal seat surface $12d^3$ of the plunger $12d$ such that the lower surface $12e^2$ of the circular seal $12e$ is disposed adjacent the seal seat surface $12d^3$ of the plunger $12d$.

The spring seat $12b$, the coil spring $12c$, the plunger $12d$ and the circular seal $12e$ are arranged within a passage $12g_2^1$ of the lower housing portion $12g_2$ of the housing $12g$. An outer threaded surface $12b^4$ of the spring seat $12b$ is threadingly-coupled to an inner threaded surface $12g_2^2$ that partially defines the passage $12g_2^1$ of the lower housing portion $12g_2$. Upon fully threadingly connecting the outer threaded surface $12b^4$ of the spring seat $12b$ to the inner threaded surface $12g_2^2$ of the lower housing portion $12g_2$ (and, as a result of the coil spring $12c$ being arranged in an expanded orientation), the upper surface $12e^1$ of the circular seal $12e$ is disposed adjacent a ring-shaped shoulder surface $12g_2^3$ that partially defines the passage $12g_2^1$ of the lower housing portion $12g_2$ thereby securing: the spring seat $12b$, the coil spring $12c$, the plunger $12d$ and the circular seal $12e$ to the lower housing portion $12g_2$ of the housing $12g$.

A stem portion $12d^4$ of the plunger $12d$ extends through the passage $12g_2^1$ and beyond a distal surface $12g_2^4$ of the lower housing portion $12g_2$. Further, the stem portion $12d^4$ of the plunger $12d$ extends through a passage $12f^1$ formed by a central tube $12f^2$ of the indexing carrier $12f$ until a proximal surface $12f^3$ of the indexing carrier $12f$ is disposed adjacent a shoulder surface $12d^5$ of the stem portion $12d^4$ of the plunger $12d$. The indexing carrier $12f$ is not fitted to the plunger $12d$, and, therefore, the indexing carrier $12f$ is permitted to rotate about the stem portion $12d^4$ of the plunger $12d$.

A proximal surface $12g_1^1$ of the upper housing portion $12g_1$ of the housing $12g$ is then arranged over the distal surface $12g_2^4$ of the lower housing portion $12g_2$ of the housing $12g$ such that stem portion $12d^4$ of the plunger $12d$ and the indexing carrier $12f$ are arranged within a passage $12g_1^2$ of the upper housing portion $12g_1$ of the housing $12g$. The proximal surface $12g_1^1$ of the upper housing portion $12g_1$ may be joined (e.g., by way of a friction-fit connection) to the distal surface $12g_2^4$ of the lower housing portion $12g_2$ by way of, for example, a mating configuration (e.g., female portions $12g_1^3$ formed by the proximal surface $12g_1^1$ of the upper housing portion $12g_1$ and male portions $12g_2^5$ formed by the distal surface $12g_2^4$ of the lower housing portion $12g_2$).

Once the upper housing portion $12g_1$ and the lower housing portion $12g_2$ are secured to one another (e.g., by way of a friction-fit connection of the female portions $12g_1^3$ and the male portions $12g_2^5$), the body $12a$ may be disposed over: a side surface $12g_1^4$, $12g_2^6$ of each of the upper housing portion $12g_1$ and the lower housing portion $12g_2$, a proximal surface $12g_2^7$ of the lower housing portion $12g_2$ and a distal surface $12g_1^5$ of the upper housing portion $12g_1$. In some implementations, the body $12a$ may be molded over the side surfaces $12g_1^4$, $12g_2^6$, the proximal surface $12g_2^7$ and the distal surface $12g_1^5$. In other examples, the body $12a$ may be made from pre-formed components and joined together using urethanes, epoxies, glues, welding techniques and the like. When the body $12a$ is disposed over the upper housing portion $12g_1$ and the lower housing portion $12g_2$ as described above, the upper housing portion $12g_1$ is non-removably-retained to the lower housing portion $12g_2$, thereby non-removably-containing: the spring seat $12b$, the coil spring $12c$, the plunger $12d$, the circular seal $12e$ and the indexing carrier $12f$ within the housing $12g$.

In some examples as seen in FIG. 2, the body 12a may be formed to include a parallelepiped-shaped geometry having: opposing acute angle corner portions $12a^1$ corresponding to the opposing acute angle $\theta_A$ corner portions 34 of the inner opening 30 and the outer opening 32 of the passage 14p formed by the self-inflating bladder 14 and opposing obtuse angle corner portions $12a^2$ corresponding to the opposing obtuse angle $\theta_O$ corner portions 36 of the inner opening 30 and the outer opening 32 of the passage 14p formed by the self-inflating bladder 14. When the body 12a is disposed within the passage 14p, an airtight fit is provided between body 12a and the inner surfaces 16, 20 of the upper bladder portion 14' and the lower bladder portion 14". Any number of means can be used to secure the body 12a to the self-inflating bladder 14 for forming the airtight seal; such means may include, for example: adhesives, epoxies, glues, heat welding techniques, vibration welding techniques or the like.

Referring back to FIG. 7, after the body 12a is disposed over the upper housing portion $12g_1$ and the lower housing portion $12g_2$ as described above, a proximal end $12h^1$ of the push button 12h is arranged over a distal end $12g_1^6$ of the upper housing portion $12g_1$ and then inserted into the passage $12g_1^2$ of the upper housing portion $12g_1$ until a distal tip $12d^6$ of the stem portion $12d^4$ of the plunger 12d registers within a receiver $12h^2$ formed by the push button 12h. The distal tip $12d^6$ of the stem portion $12d^4$ of the plunger 12d may be friction-fit with or adhered to the receiver $12h^2$ formed by the push button 12h.

As seen in FIGS. 7 and 11A-11C, the trim bezel 12i and the retaining ring 12j secure a distal end (e.g., generally defined by the upper housing portion $12g_1$) of the valve 12 to the shell 76. As described above, the self-inflating bladder assembly 10 may be utilized alone in the absence of the shell 76; therefore, when the self-inflating bladder assembly 10 is not utilized in conjunction with the shell 76, in some implementations, the valve 12 may not include the trim bezel 12i and the retaining ring 12j.

As seen in FIGS. 11A-11C, a portion of a perimeter 90 of the upper shell portion 76' and a portion of the perimeter 92 of the lower shell portion 76" are not joined together and thereby forming a passage $76_P$. The distal end $12g_1^6$ of the upper housing portion $12g_1$ is generally arranged within the passage $76_P$ of the shell 76, and, the trim bezel 12i is arranged about the passage $76_P$ of the shell 76 such that a circumferential portion of a proximal surface $12i^1$ of the trim bezel 12i is arranged adjacent the outer surface 80, 84 of each of the upper shell portion 76' and the lower shell portion 76". The circumferential portion of the proximal surface $12i^1$ of the trim bezel 12i may be secured to the outer surface 80, 84 of each of the upper shell portion 76' and the lower shell portion 76" in desirable manner including, for example: adhesives, epoxies, glues, heat welding techniques, vibration welding techniques or the like.

Then, legs $12j^1$ extending away from a proximal surface $12j^2$ of the retaining ring 12j are inserted through leg-receiving passages $12i^2$, $12g_1^7$ (see, e.g., FIG. 7) of the trim bezel 12i and upper housing portion $12g_1$ until a barb $12j^3$ of each leg $12j^1$ is disposed adjacent a proximal shoulder surface $12g_1^8$ (see, e.g., FIG. 7) of the upper housing portion $12g_1$. Once the retaining ring 12j is secured to the upper housing portion $12g_1$ as described above, the distal end (e.g., generally defined by the upper housing portion $12g_1$) of the valve 12 is mechanically secured to the shell 76 by way of: upper housing portion $12g_1$, the trim bezel 12i and the retaining ring 12j.

Referring to FIG. 11A, the valve 12 is shown in a closed orientation, preventing the cavity 38 of the self-inflating bladder 14 from being in fluid communication with surrounding atmosphere, A. The closed orientation of the valve 12 results from the coil spring 12c axially urging the plunger 12d in a direction according to the arrow, Y, such that the upper surface $12e^1$ of the circular seal 12e is disposed adjacent the ring-shaped shoulder surface $12g_2^3$ of the lower housing portion $12g_2$. A user may desire to selectively arrange the valve 12 in an open orientation (see, e.g., FIG. 11B) or a partially open orientation (see, e.g., FIG. 11C) by applying an axial force in the direction of arrow, Y' (which is opposite the direction of arrow, Y), to the push button 12h; the axial force in the direction of the arrow, Y', overcomes the bias applied by the coil spring 12c in the direction of the arrow, Y, for the purpose of unseating the circular seal 12e from the ring-shaped shoulder surface $12g_2^3$ of the lower housing portion $12g_2$. When the circular seal 12e is unseated from the ring-shaped shoulder surface $12g_2^3$, the cavity 38 of the self-inflating bladder 14 is permitted to be in fluid communication with surrounding atmosphere, A, and, as a result, air may be evacuated from (according to the direction of arrow, X, in FIG. 4A) or drawn into (according to the direction of arrow, X', in FIG. 4B) the cavity 38 depending on the application of the external force, F, as seen in FIG. 4A (or lack thereof as seen in FIG. 4B).

Figure 8A:
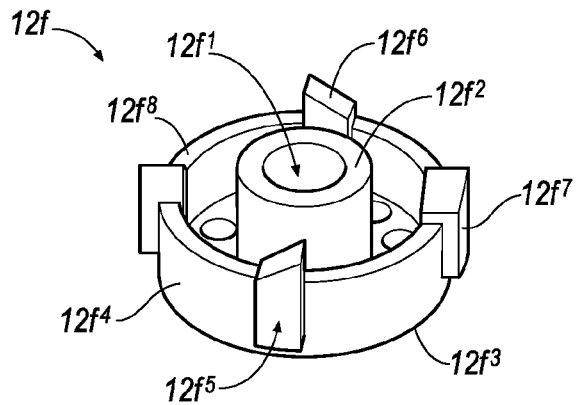
FIG. 8A is a perspective view of an indexing carrier of the valve of FIG. 7.
Figure 8B:
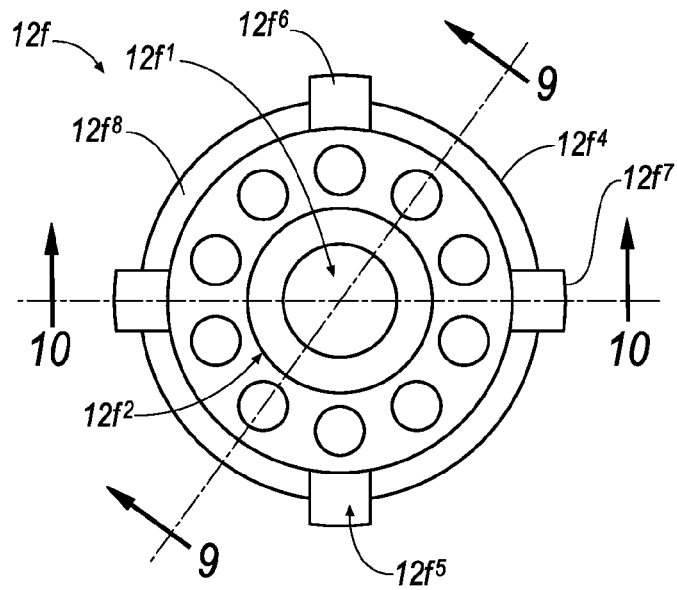
FIG. 8B is a top view of the indexing carrier of FIG. 8A.
Figure 8C:
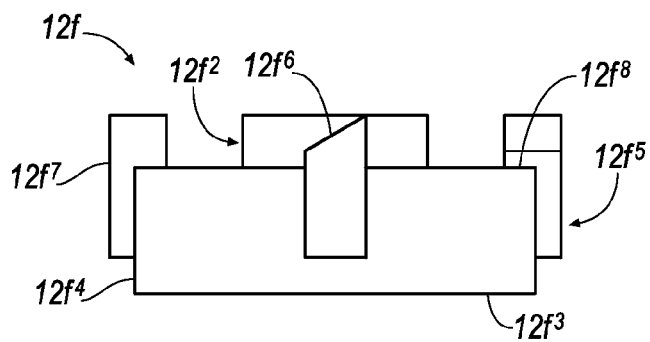
FIG. 8C is a side view of the indexing carrier of FIG. 8A.
Figure 9:
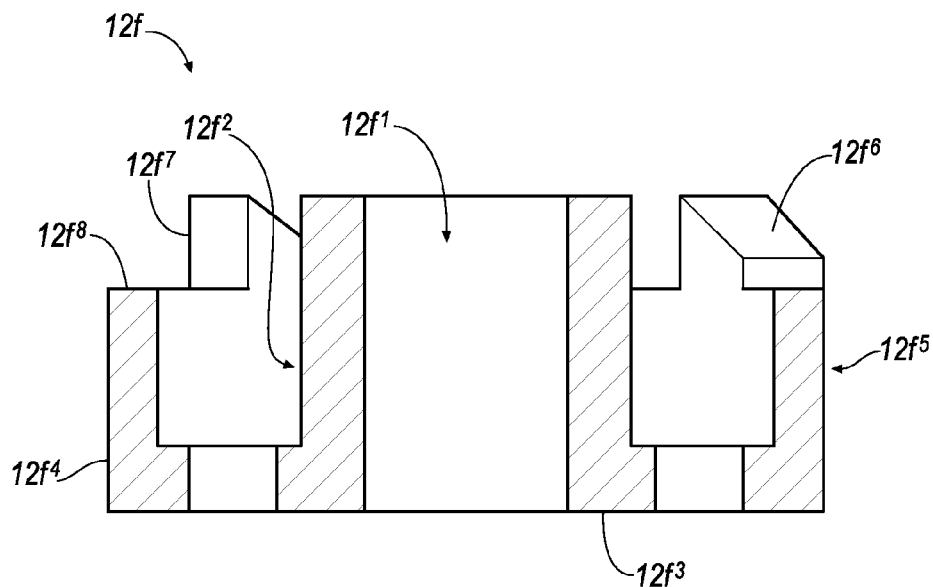
FIG. 9 is a cross-sectional view of the indexing carrier according to line 9-9 of FIG. 8B.
Figure 10:
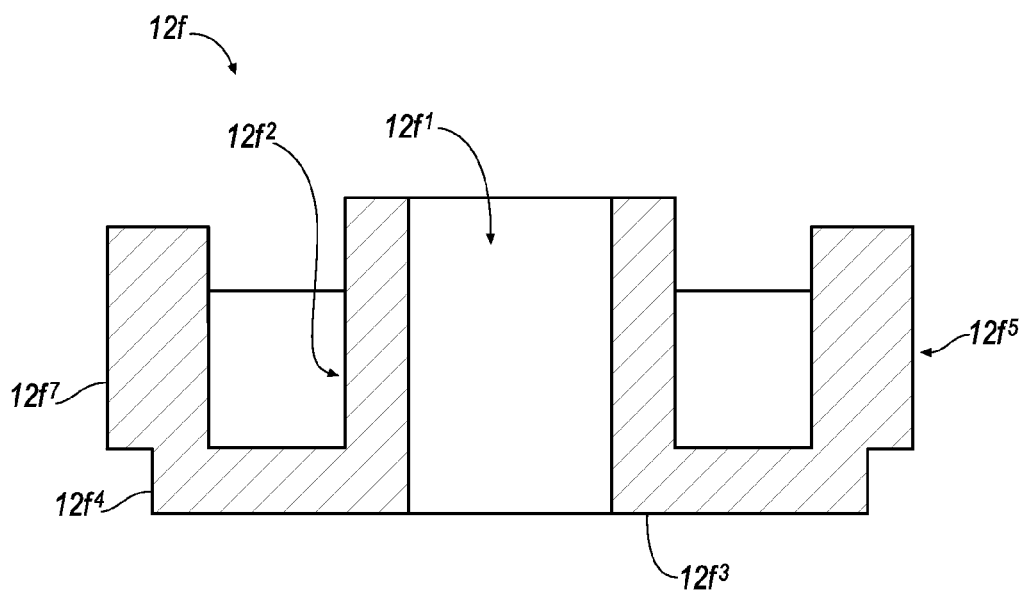
FIG. 10 is a cross-sectional view of the indexing carrier according to line 10-10 of FIG. 8B.

As described above, the push button 12h is an actuator that permits the valve 12 to be arranged in one of three states, being: an open orientation, a closed orientation and a partially open, "bleeding" orientation. The open/closed orientations of the valve 12 arise from cooperating structural surfaces of: the push button 12h, the indexing carrier 12f and the upper housing portion $12g_1$. For example, as seen in FIG. 7, the proximal end $12h^1$ of the push button 12h is defined by a proximal circumferential camming surface. The proximal circumferential camming surface $12h^1$ may be characterized by a saw-tooth shape. Referring to FIGS. 8A-10, the indexing carrier 12f includes a circular side surface $12f^4$ and four circumferentially-spaced-apart posts $12f^5$ that are arranged about the circular side surface $12f^4$. As seen in FIG. 8B, each post $12f^5$ is circumferentially spaced apart from one another by approximately 90° and includes a distal camming surface $12f^6$. As seen in FIGS. 8B and 8C and 10, an outer surface $12f^7$ of each post $12f^5$ projects radially beyond the circular side surface $12f^4$ of the indexing carrier 12f. Referring to FIG. 7, an inner surface $12g_1^9$ defining the passage $12g_1^2$ of the upper housing portion $12g_1$ includes four proximal camming surfaces $12g_1^{10}$ and four slots $12g_1^{11}$. The camming surfaces $12g_1^{10}$ are separated by the slots $12g_1^{11}$ such that each camming surface $12g_1^{10}$ and each slot $12g_1^{11}$ is spaced apart by approximately 90°.

Referring to FIGS. 7, 8A-10 and 11A-11C, a method for operating the valve 12 is described. Firstly, as seen in FIG. 11A, the valve 12 is shown in a closed orientation such that the upper surface $12e^1$ of the circular seal 12e is disposed adjacent the ring-shaped shoulder surface $12g_2^3$, thereby preventing the cavity 38 from being in fluid communication with surrounding atmosphere, A. When a user desires that the valve 12 should be arranged in an open orientation (see, e.g., FIG. 11B), the user applies an axial force in the direction of arrow, Y', to the push button 12h.

In response to the application of the axial force in the direction of the arrow, Y', to the push button 12h, axial movement of the push button 12h is imparted to the plunger 12d, which is correspondingly axially imparted toward the coil spring 12c such that the coil spring 12c is axially compressed (as seen in FIG. 11B) between the inner shoulder surface $12d^2$ of the plunger $12d$ and the spring seat surface $12b^2$ of the spring seat $12b$. Because the circular seal $12e$ is arranged within (and attached to) the circular channel formed by a seal seat surface $12d^3$ of the plunger $12d$, the circular seal $12e$ is axially displaced with the plunger $12d$, and, therefore, is moved axially away from the ring-shaped shoulder surface $12g_2^3$ of the lower housing portion $12g_2$. When the circular seal $12e$ is axially displaced as described above, and, as seen in FIG. 11B, the circular seal $12e$ is unseated from the ring-shaped shoulder surface $12g_2^3$; as a result, the cavity 38 of the self-inflating bladder 14 is permitted to be in fluid communication with surrounding atmosphere, A.

When the valve 12 is initially arranged in the closed orientation as described above at FIG. 11A, the four equally-spaced-apart posts $12f^5$ of the indexing carrier $12f$ are registered within the four slots $12g_1^{11}$ formed by the inner surface $12g_1^9$ defining the passage $12g_1^2$ of the upper housing portion $12g_1$. When the axial force in the direction of the arrow, Y', is applied to the push button $12h$, the proximal circumferential camming surface $12h^1$ of the push button $12h$ engages the distal camming surface $12f^6$ of each post $12f^5$ of the indexing carrier $12f$, which results in: axial displacement of the indexing carrier $12f$ within the passage $12g_1^2$ of the upper housing portion $12g_1$ and rotation of the indexing carrier $12f$ in a direction toward the four proximal camming surfaces $12g_1^{10}$ of the upper housing portion $12g_1$ in order to initiate a quarter rotation of the indexing carrier $12f$ about the stem portion $12d^4$ of the plunger $12d$.

Referring to FIG. 11B, after a full axial stroke displacement of the push button $12h$, which subsequently results in initiation of the rotation of the indexing carrier $12f$ as described above, the distal camming surface $12f^6$ of each post $12f^5$ of the indexing carrier $12f$ are deregistered from the four slots $12g_1^{11}$ formed by the inner surface $12g_1^9$ defining the passage $12g_1^2$ of the upper housing portion $12g_1$ and engages the four proximal camming surfaces $12g_1^{10}$ formed by the inner surface $12g_1^9$ defining the passage $12g_1^2$ of the upper housing portion $12g_1$. Once the distal camming surface $12f^6$ of each post $12f^5$ of the indexing carrier $12f$ are placed in physical communication with the four proximal camming surfaces $12g_1^{10}$ of the upper housing portion $12g_1$, the coil spring $12c$ may firstly axially compress and then subsequently axially expand for axially urging the plunger $12d$ in the direction of the arrow, Y, in order to cause the indexing carrier $12f$ to be rotated 90° (i.e., a quarter turn) about the stem portion $12d^4$ of the plunger $12d$ until the distal camming surface $12f/6$ of each post $12f^5$ of the indexing carrier $12f$ are registered and locked with the four proximal camming surfaces $12g_1^{10}$ of the upper housing portion $12g_1$.

The user may subsequently desire to return the valve 12 back to the closed orientation (as seen in FIG. 11A) by depressing the push button $12h$ once again and applying an external axial force in the direction of the arrow, Y'. By doing so, the proximal circumferential camming surface $12h^1$ of the push button $12h$ engages a distal circumferential perimeter $12f^8$ (see, e.g., FIGS. 8A-8C) between each post $12f^5$ of the indexing carrier $12f$, which results in: rotation of indexing carrier $12f$ about the stem portion $12d^4$ of the plunger $12d$ as a result of the distal camming surface $12f^6$ of each post $12f^5$ of the indexing carrier $12f$ sliding against the four proximal camming surfaces $12g_1^{10}$ formed by the inner surface $12g_1^9$ defining the passage $12g_1^2$ of the upper housing portion $12g_1$ such that each post $12f^5$ of the indexing carrier $12f$ is subsequently deregistered from the four proximal camming surfaces $12g_1^{10}$ formed by the inner surface $12g_1^9$ defining the passage $12g_1^2$ of the upper housing portion $12g_1$. Once each post $12f^5$ of the indexing carrier $12f$ is deregistered from the four proximal camming surfaces $12g_1^{10}$ of the upper housing portion $12g_1$, each post $12f^5$ of the indexing carrier $12f$ are axially aligned with the four slots $12g_1^{11}$ formed by the inner surface $12g_1^9$ defining the passage $12g_1^2$ of the upper housing portion $12g_1$. When each post $12f^5$ of the indexing carrier $12f$ are aligned with the four slots $12g_1^{11}$ of the upper housing portion $12g_1$, the coil spring $12c$ expands and axially urges the plunger $12d$ in the direction of the arrow, Y, in order to re-register each post $12f^5$ of the indexing carrier $12f$ within the four slots $12g_1^{11}$ of the upper housing portion $12g_1$. Once each post $12f^5$ of the indexing carrier $12f$ is re-registered with the four slots $12g_1^{11}$ of the upper housing portion $12g_1$, the upper surface $12e^1$ of the circular seal $12e$ is disposed adjacent a ring-shaped shoulder surface $12g_2^3$, and, as a result, the cavity 38 of the self-inflating bladder 14 is no longer in fluid communication with surrounding atmosphere, A.

In some instances as seen in FIG. 11C, the valve 12 may be temporarily transitioned from the closed orientation of FIG. 11A to a partially open orientation, which may be alternatively referred to as a "bleeding" orientation. Such an orientation may be desirable when the external force, F (see, e.g., FIG. 4A), is applied in order to incrementally force air out of the bladder in the direction of arrow, X (see, e.g., FIG. 4A), by discretely depressing the push button $12h$ in a manner in the direction of arrow, Y'. When the push button $12h$ is pushed in such a manner, a full axial stroke (as seen in FIG. 11B) of the push button $12h$ is not conducted; rather, the push button $12h$ may be slightly "tapped" in order to temporarily unseat the upper surface $12e^1$ of the circular seal $12e$ from being disposed adjacent a ring-shaped shoulder surface $12g_2^3$. When such an action is conducted, each post $12f^5$ of the indexing carrier $12f$ is not permitted to be deregistered from the four slots $12g_1^{11}$ (i.e., each post $12f^5$ of the indexing carrier $12f$ is permitted to partially axially travel within the four slots $12g_1^{11}$ without each post $12f^5$ of the indexing carrier $12f$ being permitted to engage the four proximal camming surfaces $12g_1^{10}$ of the upper housing portion $12g_1$).

As seen in FIGS. 11B and 11C, air is permitted to travel (according to the direction of arrows X or X'—noting that FIGS. 11B and 11C is only illustrating exemplary airflow according to the direction of arrow, X) in a first gap G1 that is created when the upper surface $12e^1$ of the circular seal $12e$ is unseated from ring-shaped shoulder surface $12g_2^3$. Additionally, air is also permitted to flow in a second gap G2 that is created as a result of the seal seat surface $12d^3$ of the plunger $12d$ having an outer diameter that is slightly less than a passage diameter formed by the passage $12g_2^1$ of the lower housing portion $12g_2$.

In addition to air being permitted to flow, X/X', in the above-described gaps G1-G2, the plurality of interconnected structural components $12a$-$12j$ of the valve 12 may also be formed to include airflow passages P1-P4 to permit fluid communication between the cavity 38 and surrounding atmosphere, A. A first airflow passage shown generally at P1 is formed by the spring seat $12b$. A second airflow passage shown generally at P2 is formed by the lower housing portion $12g_2$. A third airflow passage shown generally at P3 is formed by the indexing carrier $12f$. A fourth airflow passage shown generally at P4 is formed by the push button $12h$.

In addition to the gaps G1-G2 and the airflow passages P1-P4, passages $12g_2^1$, $12g_1^2$ that have been described above for permitting the plurality of interconnected structural components 12a-12j of the valve 12 to be assembled together may also be utilized to permit air to flow, X/X', through the valve 12. For example, air is permitted to flow through: the passage $12g_2^1$ of the lower housing portion $12g_2$ and the passage $12g_1^2$ of the upper housing portion $12g_1$.

With reference to FIG. 11B, air may flow, X, out of the cavity 38 and into surrounding atmosphere, A, as follows. Air may flow through, in the following order: the airflow passage P1 formed by the spring seat 12b, the passage $12g_2^1$ of the lower housing portion $12g_2$, into the gap G2 formed by the outer diameter of the seal seat surface $12d^3$ of the plunger 12d and the passage diameter formed by the passage $12g_2^1$ of the lower housing portion $12g_2$, the airflow passage P2 formed by the lower housing portion $12g_2$, the passage $12g_1^2$ of the upper housing portion $12g_1$, the airflow passage P3 formed by indexing carrier 12f, and the airflow passage P4 formed by the push button 12h. When air flows in the direction of the arrow, X', which is opposite the arrow, W, the air may flow in the reverse order described above starting with the airflow passage P4 formed by the push button 12h and ending with the airflow passage P1 formed by the spring seat 12b.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A cushion assembly, comprising:
   a valve including: a housing; a plunger that axially supports: a seal, and an indexing member within the housing, wherein the valve further includes a biasing member supported by a seat member that axially biases the plunger relative the housing in a first axial direction in order to axially bias the seal in the first axial direction toward a sealing surface formed by the housing, wherein arrangement of the seal adjacent the sealing surface formed by the housing prevents fluid flow through the valve, wherein when the seal is arranged adjacent the sealing surface formed by the housing, a distal camming surface of the indexing member is not registered adjacent a corresponding camming surface of the housing, wherein the valve further includes a push button actuator arranged for movement relative the housing in a second axial direction that is opposite the first axial direction such that movement of the push button actuator relative the housing in the second axial direction results in a corresponding movement imparted to the plunger in the second axial direction, wherein movement of the plunger in the second axial direction results in corresponding axial movement of the seal in the second axial direction such that the seal is axially moved away from the sealing surface formed by the housing to thereby permit fluid flow through the valve;
   a bladder forming a passage; the valve supportably-retained within the passage in an airtight fit with respect to the bladder; and cushioning media contained within a cavity formed by the bladder, wherein the cushioning media is spatially deformable between an at-rest, expanded orientation and a fully compressed orientation, wherein arrangement of the valve in a closed orientation prevents the cavity from being in fluid communication with atmosphere surrounding the bladder, wherein arrangement of the valve in a fully open or partially open orientation permits the cavity to be in fluid communication with the atmosphere surrounding the bladder;
   a shell forming a passage, wherein the shell includes an interior surface and an exterior surface, wherein the interior surface of the shell defines a shell cavity;
   the self-inflating assembly disposed within the shell cavity, wherein the valve is arranged within the passage formed by the shell;
   a trim bezel arranged about the passage of the shell such that a proximal surface of the trim bezel is disposed adjacent the outer surface of the shell; and
   a retaining ring including projections inserted through passages formed by the trim bezel and housing for securing the valve to the shell.

2. The cushion assembly according to claim 1, wherein the shell includes a fabric material.

3. The cushion assembly according to claim 2, wherein the fabric material is a water proof or water resistant porous material that permits air to flow there-through.

4. The cushion assembly according to claim 1, further comprising:
   cushioning media disposed within the shell cavity and arranged between the bladder and the interior surface of the shell.

* * * * *